(12) United States Patent
Sardella et al.

(10) Patent No.: US 8,688,934 B1
(45) Date of Patent: Apr. 1, 2014

(54) METHOD FOR CACHING DATA

(75) Inventors: Steven D. Sardella, Marlborough, MA (US); Robert W. Beauchamp, Milford, MA (US); Douglas Sullivan, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1466 days.

(21) Appl. No.: 10/881,562

(22) Filed: Jun. 30, 2004

(51) Int. Cl.
*G06F 12/16* (2006.01)

(52) U.S. Cl.
USPC ............ 711/162; 711/118; 711/161; 714/6.1; 714/6.23

(58) Field of Classification Search
USPC .................... 711/118, 161, 162; 714/6.1, 6.23
See application file for complete search history.

(56) References Cited

U.S. PATENT DOCUMENTS

| | | | |
|---|---|---|---|
| 6,859,865 B2 * | 2/2005 | De Margerie et al. | 711/162 |
| 7,152,078 B2 * | 12/2006 | Yamagami | 707/204 |
| 2002/0087788 A1 * | 7/2002 | Morris | 711/114 |
| 2003/0088735 A1 * | 5/2003 | Busser et al. | 711/114 |
| 2003/0177306 A1 * | 9/2003 | Cochran et al. | 711/114 |
| 2004/0044865 A1 * | 3/2004 | Sicola et al. | 711/162 |
| 2005/0193179 A1 * | 9/2005 | Cochran et al. | 711/162 |

* cited by examiner

*Primary Examiner* — Jae Yu
(74) *Attorney, Agent, or Firm* — Krishnendu Gupta; Konrad R. Lee

(57) ABSTRACT

A method of caching data includes:
  A. mirroring data processed by a first storage processor and a second storage processor between a first memory device of the first storage processor and a second memory device of the second storage processor;
  B. each of the first storage processor and the second storage processor monitoring an availability of the other of the first storage processor and the second storage processor;
  C. copying data stored in the first memory device to a third memory device and mirroring data processed by the first storage processor between the first memory device and the third memory device when the second storage processor becomes unavailable to the first storage processor; and
  D. copying data from the first memory device to the second memory device and mirroring data processed by the first storage processor and the second storage processor between the first memory device and the second memory device when the second storage processor becomes available to the first storage processor.

15 Claims, 2 Drawing Sheets

METHOD FOR CACHING DATA

FIELD OF THE INVENTION

The present invention is directed generally to a method for caching data and, more particularly, to a method for mirroring cache data to a cache storage device when one of a pair of storage processors becomes unavailable for mirroring cache between the storage processors.

BACKGROUND OF THE INVENTION

Data storage systems can include two storage processors for handling the data processing and caching operations of the storage system. The two storage processors enable the system to perform up to twice as much work in parallel than a single processor and enable the system to be cache-enabled. Write data that is processed by the storage processors is eventually written to disk drives in the disk drive array. However, because the process of writing data to a disk drive takes much longer than the amount of time required by the storage processor to process incoming data, the data is stored in cache memory before it is finally written to the disk drive. This type of data is called write cache data because it is in the process of being written to the disk drive, but has not yet been written to the disk drive.

Both storage processors process data read and write commands for the system concurrently. In order to prevent a loss of all write cache data stored in the cache memory associated with a particular processor in the event that the particular processor becomes unavailable or fails, the write cache data is stored in the cache memories associated with both storage processors through a mechanism called mirroring. Data mirroring involves providing an exact copy of all data on each storage processor's cache memory to the cache memory of the other storage processor. This is done so that, at any point in time, the cache memories associated with each storage processor are exactly the same. In the event that one of the storage processors should fail, none of its write cache data is lost, because it has been stored on the "peer" storage processor with which the failed storage processor cooperates.

However, when one of the pair of storage processors fails, the remaining operative storage processor can no longer write cache data, because it has lost the mirror cache memory associated with the failed storage processor. Furthermore, if the operative storage processor were to fail, any write cache data that it has stored locally would be lost. Therefore, in order to minimize or prevent the loss of data, the operative storage processor must write all write data that it processes to the disk drive array as the storage processor processes the data. The loss of a storage processor coupled with the inability of the remaining processor to cache the data severely impairs the operation of the system.

SUMMARY OF THE INVENTION

The present invention enables the operative storage processor to continue caching the write data after the failure of its peer storage processor by providing a secondary cache memory device, separate from the failed storage processor. Upon the failure of one of the storage processors, the remaining processor copies all of the write cache data stored in its cache memory to the secondary cache memory device. As the remaining processor continues to operate, it mirrors its write cache to the secondary cache memory device. This insures that there are two copies of the write data on the system. In the event that the remaining storage processor fails, all of the write data is still accessible from the secondary cache memory device.

According to one embodiment, a method of caching data includes:

A. mirroring data processed by a first storage processor and a second storage processor between a first memory device of the first storage processor and a second memory device of the second storage processor;

B. each of the first storage processor and the second storage processor monitoring an availability of the other of the first storage processor and the second storage processor;

C. copying data stored in the first memory device to a third memory device and mirroring data processed by the first storage processor between the first memory device and the third memory device when the second storage processor becomes unavailable to the first storage processor; and D. copying data from the first memory device to the second memory device and mirroring data processed by the first storage processor and the second storage processor between the first memory device and the second memory device when the second storage processor becomes available to the first storage processor.

The first, second and third memory devices may include cache memory. The first storage processor and the second storage processor may be interconnected according to a PCI protocol. Step B may include transmitting heartbeat signals between the first storage processor and the second storage processor over a first communication link. Step B may include transmitting heartbeat signals between the first storage processor and the second storage processor over a second communication link when the heartbeat signals transmitted by one of the first and second storage processors are not received by the other of the first and second storage processors over the first communication link.

BRIEF DESCRIPTION OF THE DRAWINGS

These and other features of the invention will become more readily apparent from the following detailed description when read together with the accompanying drawings, in which.

DETAILED DESCRIPTION

Figure 1:
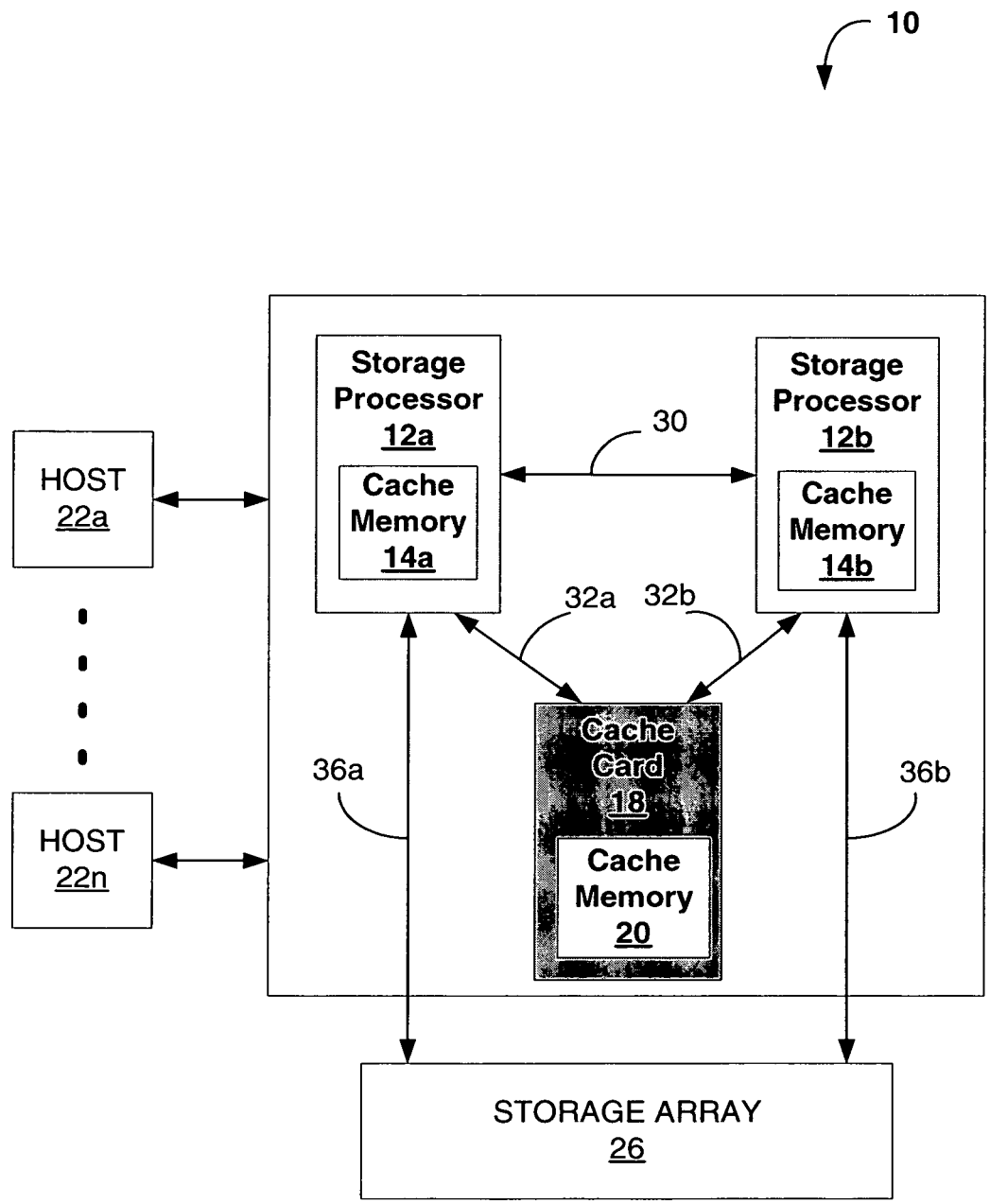
FIG. 1 is a schematic block diagram of the data caching system in accordance with the present invention.

FIG. 1 is a schematic block diagram of a data storage system 10 for caching data according to the invention. The data storage system 10 is configured to store and retrieve information on behalf of a set of external hosts 22a-22n. The data storage system 10 may include one or more network interfaces (not shown) to enable the data storage system 20 to communicate with the hosts 22a-22n using a variety of different protocols, e.g., TCP/IP communications, Fibre Channel, count-key-data (CKD) record format, block I/O, etc.

As shown in FIG. 1, the data storage system 10 includes a first storage processor 12a, a second storage processor 12b, a cache card memory device 18 and an array 26 of storage devices, such as disk drives. Storage processor 12a includes a cache memory device 14a and storage processor 12b includes a cache memory device 14b. Cache memory devices 14a and 14b are used for temporarily storing data processed by the storage processors 12a and 12b, respectively, while the data is being written to disks in the storage array 26 over communication links 36a and 36b, respectively. Storage processors 12a and 12b are interconnected via communications link 30, for the purpose of enabling communications between the storage processors. As data is processed by each storage processor and stored in the cache memory device associated with the storage processor, the data is simultaneously written, via link 30, to the cache memory device of the other storage processor according to a process known as cache mirroring. This process insures that the cache data stored in cache memory device 14a is an exact copy of the data stored in cache memory device 14b and that the cache data stored in cache memory device 14b is an exact copy of the data stored in cache memory device 14a. In the event that one of the storage processors 12a, 12b should become inoperative, no cache data would be lost, since the available processor maintains a copy of all cache data in its cache memory device. In the preferred embodiment, communication link 30 is configured according to the PCI Express protocol. It will be understood, however, that any type of suitable communications protocol may be utilized, such as a CMI bus, GP/IO lines, wireless pathways, optical pathways, and the like.

Communication link 30 also enables each storage processor to transmit and receive "heartbeat" signals. Heartbeat signals are used by each of storage processors 12a, 12b to notify the other that it is operating normally. The heartbeat signals are transmitted at predetermined intervals and, as long as each storage processor receives the heartbeat signals according to the predetermined interval, operation continues normally. However, if one storage processor does not receive the heartbeat signal during the predetermined interval, it determines that the other storage processor is inoperative. For the purpose of insuring that the failure of a storage processor and not the failure of the link 30 is the result of a non-received heartbeat signal, the storage processor that did not receive the heartbeat signal will transmit its heartbeat signal over an alternate path in link 30 and will wait for a response on the alternate path. If no response is received, the operational storage processor determines that its peer storage processor is inoperative or is unavailable.

Data storage system 10 further includes a cache card 18 which includes a cache memory device 20. Cache card 18 is coupled to storage processor 12a via communication link 32a and to storage processor 12b via communication link 32b. In the preferred embodiment, communication links 32a and 32b, between storage processors 12a, 12b and cache card 18, respectively, are also configured according to the PCI Express protocol, however, that any type of suitable communications protocol may be utilized. Each of cache memory device 14a, 14b and 20 are preferably DRAM memory devices, and cache memory device 20 is configured to be dual-ported, to enable each storage processor 12a, 12b to have access to the entire memory device.

During normal operation of the data storage system 10, the storage processors 12a, 12b process data read and write commands received from the hosts 22a-22n and read and write data to the storage array 26. Before any write data is written to the storage array 26, it is first stored and mirrored in the cache memory devices 14a, 14b of the storage processors 12a, 12b, respectively. As long as both storage processors 12a and 12b are operating normally, the cache card 18 is idle, and does not receive any write cache data from the storage processors 12a and 12b. However, upon the failure of one of the storage processors 12a, 12b to receive the heartbeat signal from the other storage processor and the determination that the other processor is unavailable, the operational storage processor immediately copies all of the write cache data in its cache memory device to the cache memory device 20 in cache card 18. The operational storage processor then continues to mirror its write cache data to the cache memory device 20. This insures that there is always a copy of the write cache data that is present in the cache memory device of the operational processor.

Figure 2:
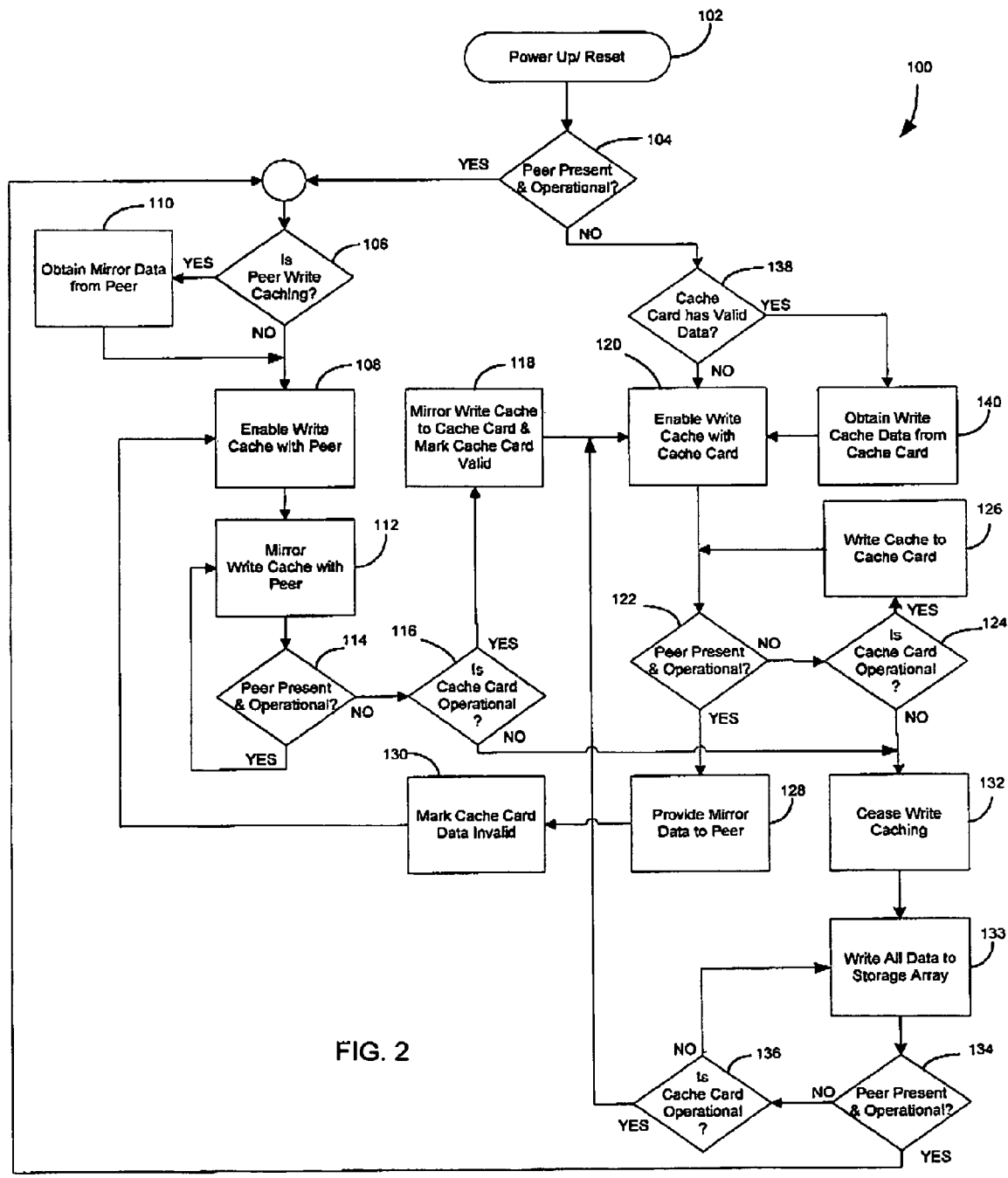
FIG. 2 is a flow diagram showing the steps carried out in the data caching method in accordance with the present invention.

The operation of the data storage system 20 will be described in greater detail with reference to FIG. 2, which is a flow diagram 100 showing the steps involved in the method of caching data according to the invention. For the purpose of example, the method will be described from the "point of view" of storage processor 12a. It will be understood that storage processor 12b is also capable of following the steps shown in flow diagram 100 simultaneously with storage processor 12a.

Upon powering up or being reset, Step 102, storage processor 12a begins sending its heartbeat signals to storage processor 12b to determine its operability status. If storage processor 12a receives heartbeat signals from storage processor 12b, indicating that storage processor 12b is present and operational, Step 104, it then determines whether storage processor 12b is writing data to its cache memory device 14b, Step 106. Storage processors 12a and 12b are configured to communicate status information to each other over communications link 30. If it is not, storage processor 12a notifies storage processor 12b that it is ready to begin write caching its data to enable both processors to begin caching together, Step 108. If, in Step 106, storage processor 12a determines that storage processor 12b is caching its write data, it performs a mirroring operation to copy the write cache data stored in the cache memory device 14b of storage processor 12b to its cache memory device 14a, Step 110. It then enables the write cache mirroring between the storage processors, Step 108.

After the write cache mirroring process is enabled, the storage processors 12a, 12b, while performing their data processing operations, mirror their write cache data with each other, Step 112. As long as each storage processor 12a, 12b, through the use of heartbeat signals, acknowledges that the peer is present and operational, Step 114, the storage processors continue write caching with each other, Step 112. However, as soon as, for example, storage processor 12a stops receiving heartbeat signals from storage processor 12b and determines that it is inoperative, Step 114, storage processor 12a communicates with cache card 18 via communication link 32a, to determine if the cache card 18 is operational, Step 116. In one embodiment, the cache card periodically performs power-on testing and periodic memory scrubbing to insure that its memory is operational and does not include any latent defects. The cache card includes a communication mechanism which informs one or both of the storage processors if it detects any memory defects. This enables a failed cache card to be discovered and replaced during normal operation of the system. Alternatively, one or both of the storage processors will periodically test the operation of the cache card during the normal caching operation.

If the cache card is determined to be operational, the storage processor 12a performs a mirroring operation to copy the write cache data stored in its cache memory device 14a to the cache memory device 20 of the cache card 18. It then sets a data valid flag in the cache card 18 to indicate that the data in the cache card is valid, meaning that it is a true mirror of the write cache data in cache memory device 14a, Step 118. In Step 120, the storage processor 12a enables its write caching operation with the cache card 18. The storage processor 12a then monitors the status of both its peer storage processor 12b, Step 122, and the cache card 18, Step 124. If the peer storage processor 12b is inoperative, Step 122 and the cache card 18 is operational, Step 124, the storage processor 12a will perform its data processing operations while writing the write data to both its cache memory device 14a and the cache memory device 20 of the cache card 18, Step 126.

If, while the storage processor 12a is writing its cache to the cache card 18, it determines, in Step 122, that the storage processor 12b has become operational and is available for caching, the storage processor 12a copies the write cache data stored in its cache memory device 14a to the cache memory device 14b of storage processor 12b, Step 128. It then removes data valid flag in the cache memory device 20 of cache card 18 to indicate that the write cache data in cache memory device 20 is no longer valid, as it will cease to be a mirror of the write cache data stored in cache memory device 14a, Step 130. Storage processor 12a then enables the write cache data mirroring between the storage processors, Step 108, and resumes the mirroring of the write cache data between the storage processors, Step 112.

If, in either Step 116 or Step 124, the storage processor 12a determines that, while the storage processor 12b is inoperative, the cache card 18 also becomes inoperative, storage processor 12a immediately ceases its write caching operation, Step 132, and must write all of the write data that it processes directly to the disks of the storage array 26. While the direct writing of data to the storage array 26 without caching can slow the operation of the data storage system 10, it will insure that none of the data is lost, as might be the case if the storage processor 12a failed while caching write data in its cache memory device 14a.

While it is writing its write data directly to the storage array 26, the storage processor continues to monitor the operational status of the storage processor 12b, Step 134, and the cache card 18, Step 136. If the storage processor 12b becomes operational, Step 134, the storage processor 12a returns to Step 106 and determines whether storage processor 12b is writing data to its cache memory device 14b. The storage processor 12a then continues from that point in the process. If the cache card 18 becomes operational before the storage processor 12b, Step 136, the storage processor 12a enables its write caching operation with the cache card 18, Step 120, and continues from that point in the process.

If, after being powered up or reset, Step 102, the storage processor 12a determines, through the heartbeat signals, that the storage processor 12b is not operational, Step 104, it determines whether the data valid flag of the cache memory device 20 of the cache card 18 has been set, Step 138, indicating that the data stored on the cache card 18 is valid, meaning that it is a mirror of the write data stored in the cache memory device 14b of storage processor 12b, before the storage processor 12b became non-operational. If the write data in the cache memory device 20 of cache card 18 is valid, storage processor 12a copies the write data stored in cache memory device 20 to its cache memory device 14a, Step 140, enables its write caching operation with the cache card 18, Step 120, and continues from that point in the process. If the write data in the cache memory device 20 of cache card 18 is not valid, storage processor 12a enables its write caching operation with the cache card 18, Step 120, and continues from that point in the process. This situation could occur if storage processor 12a were to become non-operative and, while storage processor 12b is writing data to the cache memory device 20 of cache card 18, storage processor 12b becomes non-operative. When storage processor 12a becomes operative and determines that storage processor 12b is non-operative, Step 104, storage processor 12a checks the data valid flag of the cache memory device 20 of the cache card 18, Step 138. Since the flag is set and the cache memory device 20 contains all of the write data processed by the storage processor 12b before it became non-operative, storage processor 12a copies the write data stored in cache memory device 20 to its cache memory device 14a, Step 140, enables its write caching operation with the cache card 18, Step 120, and continues from that point in the process.

Accordingly, the present invention provides a system and method for caching write data after the failure of one of a pair of cooperating storage processors. During normal operation, the write data processed by each storage processor is written to the cache memory devices of both storage processors such that an exact copy of the write cache data exists in both cache memory devices. In the event that one of the storage processors becomes inoperative, the remaining storage processor copies its write cache data to the cache memory device of the cache card and continues to write its write data to the cache card. This enables the storage processor to continue with its normal caching operation. When the other storage processor becomes available, the write cache stored in the cache memory device of the operative storage processor is copied to the cache memory device of the other storage processor and the original caching operation is resumed. Since there are always two copies of the write cache data, either on both storage processors or on one storage processor and the cache card, the write cache data is protected from loss in the event of the failure of a storage processor. Even if both of the storage processors become non-operational, according to the invention, the write cache data will have been written to the cache memory device of the cache card, and thus secured.

It should be noted that the power supply scheme employed by the data storage system insures that the failure of any single power supply does not cause more than one of the storage processors and cache card to fail. In other words, the data storage system 10 includes a redundant power supply system (not shown) that supplies power to each of the storage processors and the cache card separately and through more than one power source, such that if one of the power sources fails, the storage processors and cache card will receive power from another power source. In any event, the cache card is not powered by the same power supply that powers either storage processor.

The invention may be embodied in other specific forms without departing from the spirit or essential characteristics thereof. For example, it should be understood that the data storage system 10 was described above as having two storage processors by way of example only. In other arrangements, the data storage system 10 has more than two storage processors that write cache data to a secondary cache memory device. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:
1. A method of caching data comprising:
   A. mirroring data processed by a first storage processor from a first memory device of the first storage processor to a second memory device of a second storage processor, and mirroring data processed by the second storage processor from a second memory device of the second storage processor to the first memory device of the first storage processor;
   B. each of the first storage processor and the second storage processor monitoring an availability of the other of the first storage processor and the second storage processor;

C. copying data stored in the first memory device to a third memory device and mirroring data processed by the first storage processor between the first memory device and the third memory device when the second storage processor becomes unavailable to the first storage processor; and D. copying data from the first memory device to the second memory device and mirroring data processed by the first storage processor and the second storage processor between the first memory device and the second memory device when the second storage processor becomes available to the first storage processor.

2. The method of claim 1 wherein the first, second and third memory devices comprise cache memory.

3. The method of claim 2 wherein the first storage processor and the second storage processor are interconnected according to a PCI protocol.

4. The method of claim 1 wherein Step B includes transmitting heartbeat signals between the first storage processor and the second storage processor over a first communication link.

5. The method of claim 4 wherein Step B includes transmitting heartbeat signals between the first storage processor and the second storage processor over a second communication link when the heartbeat signals transmitted by one of the first and second storage processors are not received by the other of the first and second storage processors over the first communication link.

6. A method of caching data comprising:
A. mirroring data processed by a first storage processor from a first memory device of the first storage processor to a second memory device of a second storage processor, and mirroring data processed by the second storage processor from a second memory device of the second storage processor to the first memory device of the first storage processor;
B. each of the first storage processor and the second storage processor monitoring an availability of the other of the first storage processor and the second storage processor;
C. copying data stored in the first memory device to a third memory device and mirroring data processed by the first storage processor between the first memory device and the third memory device when the second storage processor becomes unavailable to the first storage processor; and
D. copying data from the first memory device to a data storage array when the third memory device becomes unavailable to the first storage processor while the second storage processor is unavailable to the first storage processor.

7. The method of claim 6 further including:
E. mirroring data processed by the first storage processor and the second storage processor between the first memory device of the first storage processor and the second memory device of the second storage processor when the second storage processor becomes available to the first storage processor.

8. The method of claim 6 wherein the first, second and third memory devices comprise cache memory.

9. The method of claim 8 wherein the first storage processor and the second storage processor are interconnected according to a PCI protocol.

10. The method of claim 6 wherein Step B includes transmitting heartbeat signals between the first storage processor and the second storage processor over a first communication link.

11. The method of claim 10 wherein Step B includes transmitting heartbeat signals between the first storage processor and the second storage processor over a second communication link when the heartbeat signals transmitted by one of the first and second storage processors are not received by the other of the first and second storage processors over the first communication link.

12. The method of claim 7 wherein the first, second and third memory devices comprise cache memory.

13. The method of claim 12 wherein the first storage processor and the second storage processor are interconnected according to a PCI protocol.

14. The method of claim 7 wherein Step B includes transmitting heartbeat signals between the first storage processor and the second storage processor over a first communication link.

15. The method of claim 14 wherein Step B includes transmitting heartbeat signals between the first storage processor and the second storage processor over a second communication link when the heartbeat signals transmitted by one of the first and second storage processors are not received by the other of the first and second storage processors over the first communication link.

* * * * *